Oct. 5, 1965     A. J. M. LAURENT     3,209,621

GEAR SHIFT MECHANISM

Filed July 17, 1962

INVENTOR.
ANDRE J. M. LAURENT
BY
*Eckhoff & Slick*
ATTORNEYS

United States Patent Office 3,209,621
Patented Oct. 5, 1965

3,209,621
GEAR SHIFT MECHANISM
André J. M. Laurent, 27 Quai Anatole France,
Paris, France
Filed July 17, 1962, Ser. No. 210,475
1 Claim. (Cl. 74—812)

This invention relates to a gear shift mechanism and more particularly relates to a simplified gear shift wherein speed is changed through the reversal of the driving motor and one which does not require the usual clutch or other de-coupling mechanism.

Gear shifts heretofore have employed various means which involve some mechanical shifting of gear or similar elements. These systems ordinarily involve the use of a clutch or similar coupling mechanism which can be disengaged while the gears are being shifted.

In accordance with the present invention, a simplified gear shift is provided wherein it is only necessary to reverse the direction of the driving prime mover in order to cause a shifting of speeds. Although the device is primarily adapted for use with an electric motor, since electric motors can be so easily reversed, it is obvious that the scheme can be used with any form of driving mechanism.

Generally speaking, the invention is accomplished by providing a pair of free-wheeling coupling elements of different ratios so arranged that one can be utilized as the driving element when the motor is going in one direction and the other element will become the driving element when the motor is going in the opposite direction, with the element which is not driving free-wheeling backwards.

In the drawings forming part of this application:

Figure 1:
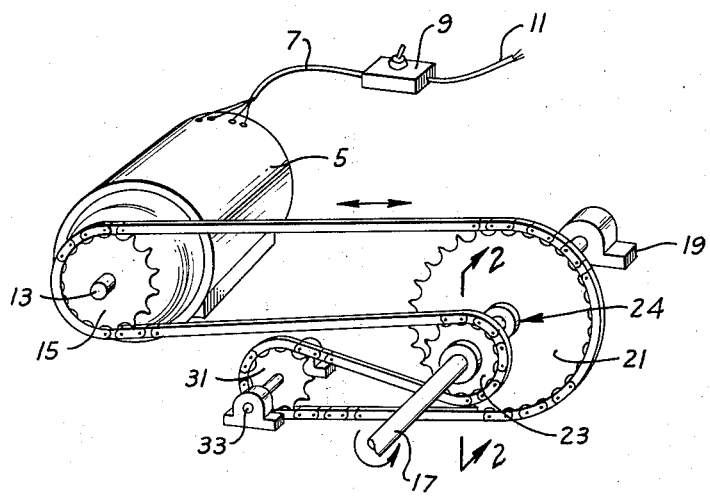
FIGURE 1 is a perspective view of a device embodying the present invention utilizing a single, endless roller chain.
Figure 2:
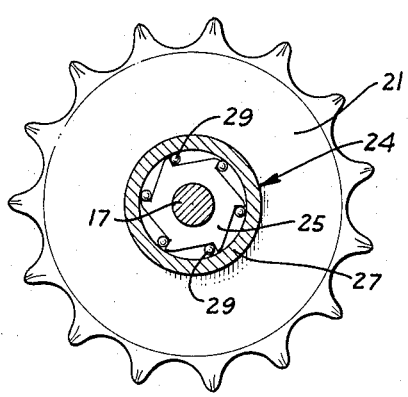
FIGURE 2 is an enlarged sectional view on the line 2—2 of FIGURE 1 showing a typical free-wheeling mechanism.

Turning now to a description of the drawings by reference characters and particularly to FIGURES 1 and 2, there is shown a prime mover such as electric motor 5 which is attached by suitable wiring 7 to a reversing switch 9 having wires 11 leading to a suitable source of electricity, not shown. The motor 5 has a shaft 13 with a sprocket 15 thereon. An output shaft 17 is mounted for rotation on suitable supports as at 19, the output shaft being generally parallel to the motor shaft 13. Mounted on the output shaft 17 are two free-wheeling sprockets 21 and 23. The sprockets 21 and 23 have different numbers of teeth and are also mounted to free wheel in same directions. Various free-wheeling mechanisms can be utilized, that shown in FIGURE 2 being typical. Here the sprocket 21 is shown having a hub mechanism 24 for mounting it on the output shaft 17. The shaft 17 has affixed thereto a ratchet wheel 25 which is normally free to rotate within the housing 27. A plurality of metal balls 29 occupy the spaces between the ratchet wheel 25 and the housing 27. It will be seen that if the sprocket 21 is rotated counter-clockwise the balls wedge between the ramp-like portions of the ratchet wheel 25 and the housing 27 causing the output shaft 17 to be driven. On the other hand, if the sprocket 21 is rotated in a clockwise direction, the balls will not wedge but will float freely within the housing so that the sprocket 21 can be spun freely in a clockwise direction without binding on the shaft 17. It will be understood that the sprocket 23 is exactly of the same construction so that it will cause the shaft to be driven when it rotates counter-clockwise but will spin freely in a clockwise direction. In addition to the sprockets so far described, an idler sprocket 31 is provided on the shaft 33 which is generally parallel to the shafts 13 and 17. The sprocket 31 is located approximately on a line half-way between the sprockets 21 and 23. Although for clarity of illustration the sprockets 21 and 23 have been shown as being rather widely spaced apart, it is obvious that a chain which is trained around the sprockets will be bent slightly out of line, so that it is desirable to have the sprockets 21 and 23 as close together as possible. An endless chain is trained around sprocket 15, over the sprocket 21, over the idler sprocket 31, back over the sprocket 23 and back to the sprocket 15 as is shown. If the motor 5 is now caused to rotate in a counter-clockwise direction, the shaft 17 will be driven at a relatively low speed, also in a counter-clockwise direction, by means of the sprocket 21, while the sprocket 23 will merely free-wheel backwards. If the motor is now reversed by means of the switch 9 so that it is rotating clockwise, the sprocket 23 will become the driving sprocket and will now drive the shaft 17 at a relatively high rate of speed in a counter-clockwise direction, as before, whereas sprocket 12 will now merely free-wheel backwards on its shaft. Instead of being merely an idler, the sprocket 31 can also act as a driving element.

Figure 3:
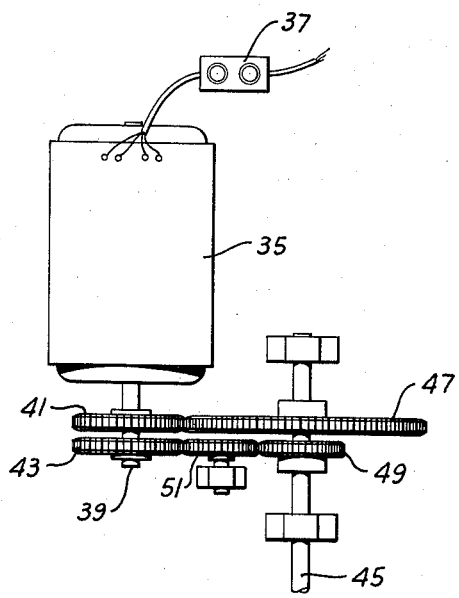
FIGURE 3 is a plan view of a device embodying the present invention wherein spur gears are used.

In FIGURE 3, another embodiment of the invention is shown utilizing spur gears rather than the roller chain. Here a motor 35 is provided with a reversing switch 37 and a shaft 39 having spur gears 41 and 43 thereon. An output shaft 45 has mounted thereon two free-wheeling spur gears 47 and 49, the gear 47 being much larger than the gear 49. Between the spurs 43 and 49 an idler 51 is provided which serves to reverse the direction of rotation between the gears 43 and 49. Here the operation is exactly the same as was described in connection with FIGURE 1; when the motor 35 rotates in one direction, drive will be between the spurs 41 and 47, imparting a relatively low speed to the output shaft 45, while if the motor is reversed, drive will be between the spurs 43 and 49, with the intermediate idler 51 so that the direction of rotation on the shaft 45 will be the same but the speed will be higher.

Figure 4:
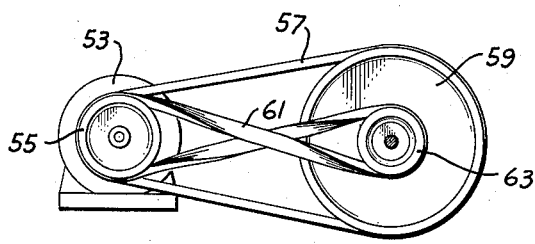
FIGURE 4 is a side view of a device embodying the present invention utilizing two separate belt drives.

In FIGURE 4, a somewhat similar arrangement is shown utilizing a belt drive with separate pulleys on the output shaft and separate belts. Here, the motor 53 is provided with two pulleys 55 in side-by-side relationship with a first belt 57 driving a pulley 59 and a second belt 61, which is reversed, driving a pulley 63. The pulleys 59 and 63 are of different sizes and each is provided with a free-wheeling mechanism as heretofore described, with the free-wheeling mechanism active in same directions. Here again when the motor is driven in one direction the pulley 59 will become the drive pulley, while the pulley 63 merely free-wheels backwards and vice versa when the motor is reversed to give two separate speeds on the output shaft.

Although it has been assumed that the gears or pulleys on the output shaft would be of different sizes, in many embodiments of the invention this need not be true. For instance, in the embodiment shown in FIGURE 3, the gears on the output shaft might be of the same size, while gears of different sizes would then be used on the drive shaft. Similarly, the free-wheeling mechanism is not of necessity incorporated in the gears of the output shaft, but could be on the gears of the drive shaft or incorporated in intermeditae gearing.

It is believed apparent from the foregoing that many departures can be made from the exact structures shown without departing from the spirit of this invention.

I claim:

Speed change mechanism comprising an output shaft, a large diameter wheel and a small diameter wheel supported concentrically on said shaft, a free wheeling clutch mechanism coupling each wheel with said shaft, said clutching mechanisms being constructed and arranged to permit said wheels to free-wheel in the same direction and to drivingly couple the wheels to the shaft upon rotation of the wheels in the reverse direction, a reversible electric motor having a motor shaft, a reversing switch control means for said motor, a drive wheel on said motor shaft and having a diameter intermediate the diameters of said large and small diameter wheels, an idler wheel supported for rotation substantially in the plane of said small diameter wheel and on an axis parallel with the axis of the small diameter wheel, and an endless drive element connecting said wheels and having a top flight extending from the top of the drive wheel to the top of said large diameter wheel and passing to the lower side of the large diameter wheel in a lower flight running directly to the lower side of the idler wheel, then passing around the idler wheel back in a short intermediate flight to the lower side of the small diameter wheel and around the small diameter wheel and back in a longer intermediate flight, parallel with said top flight, to and around said drive wheel, said endless drive element having the several flights vertically spaced and arranged substantially in a common vertical plane, said output shaft speed being stepped down from the motor shaft speed when the large diameter wheel is drivingly clutched to the output shaft and stepped up from the motor shaft speed when the small diameter wheel is drivingly clutched to the output shaft.

References Cited by the Examiner

UNITED STATES PATENTS

| 736,564 | 8/03 | Stollewerk | 74—812 |
| 797,814 | 8/05 | Mimard | 74—812 |
| 2,507,756 | 5/50 | Boylan | 74—812 |

FOREIGN PATENTS

| 932,379 | 9/55 | Germany. |
| 170,540 | 7/34 | Switzerland. |

DON A. WAITE, *Primary Examiner.*
BROUGHTON G. DURHAM, *Examiner.*